Figure 1:
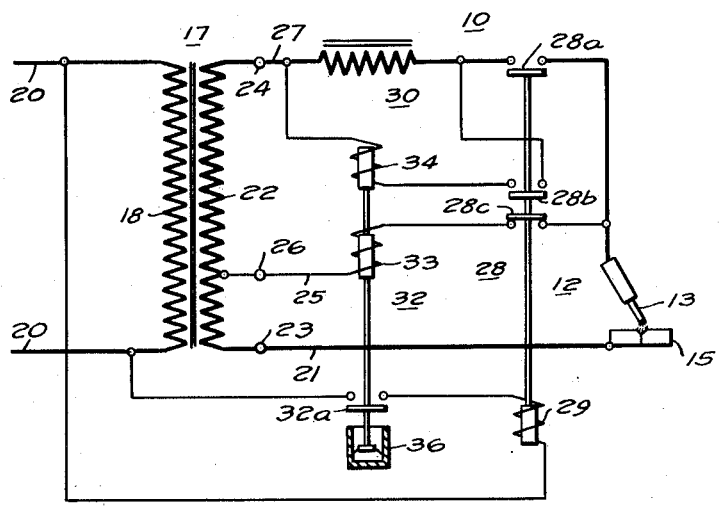

Sept. 14, 1948.  C. P. CROCO ET AL  2,449,456
ARC WELDING CONTROL SYSTEM
Filed Dec. 26, 1946

WITNESSES:

INVENTORS
Charles P. Croco and
John H. Blankenbuehler
BY
ATTORNEY

Patented Sept. 14, 1948

2,449,456

UNITED STATES PATENT OFFICE 2,449,456

ARC WELDING CONTROL SYSTEM

Charles P. Croco, Buffalo, N. Y., and John H. Blankenbuehler, Troy, Ohio, assignors to Westinghouse Electric Corporation, East Pittsburgh, Pa., a corporation of Pennsylvania Application December 26, 1946, Serial No. 718,558

8 Claims. (Cl. 315—246)

1

Our invention relates, generally, to arc welding control systems and it has reference, in particular to reduced open circuit voltage control systems for alternating current arc welding apparatus.

Generally stated, it is an object of our invention to provide a reduced open circuit voltage control system that is simple and inexpensive to manufacture, and which is reliable and efficient in operation.

More specifically, it is an object of our invention to provide a reduced open circuit voltage control system wherein a line switch is controlled directly by a time delay relay.

Another object of our invention is to provide for using a single control relay for both effecting operation of a transfer switch in a reduced open circuit voltage control system and maintaining the switch in the operated position during a welding operation.

Yet another object of our invention is to provide for using a time delay relay having dual windings for controlling the open circuit voltage in an arc welding system.

It is an important object of our invention to provide a simple and effective reduced open circuit voltage control system wherein a time delay relay which initiates operation of a line switch is reconnected by the line switch for maintaining said switch energized.

A further object of our invention is to provide for utilizing an operating winding on a time delay relay for effecting operation of the relay to energize a line switch for applying normal welding voltage to arc welding circuit, and for reconnecting the relay so as to utilize a holding winding on the relay for maintaining the relay in the energized position during a welding operation.

Other objects will, in part, be obvious and will, in part, be explained hereinafter.

In practicing our invention in one of its forms, a line switch is used to normally connect an arc welding circuit to a reduced voltage circuit. Operation of the line switch to connect the arc welding circuit to a normal welding voltage circuit is effected by a time delay relay of the delayed dropout type. The time delay relay has an operating winding normally connected to the reduced circuit for operating the relay when a welding operation is initiated and a holding winding which is connected across a current limiting reactor in the welding circuit upon operation of the line switch.

For a more complete understanding of the na-

Figure 2:
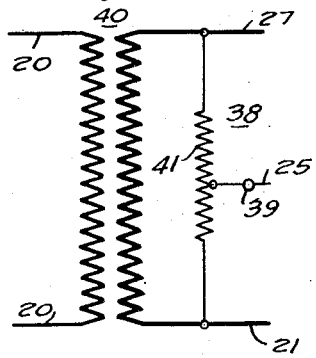

2 ture and scope of my invention, reference may be made to the following detailed description which may be studied in connection with the accompanying drawing, in which:

Figure 1 is a diagrammatic view of an arc welding system embodying the invention in one of its forms, and Fig. 2 is a diagrammatic view of a portion of an arc welding system which may be embodied in a modification of the invention.

Referring to Figure 1, the reference numeral 10 may denote, generally, an arc welding system wherein an arc welding circuit 12, including an electrode 13 and work 15 upon which an arc welding operation is to be performed, may be arranged for energization from a source of alternating current, such as the welding transformer 17.

The transformer 17 may be of any suitable type, having a primary winding 18, which may be connected to a source of alternating current by conductors 20, and a secondary winding 22 provided with terminals 23 and 24 having a reduced voltage tap 26 intermediate thereof.

The work 15 may be connected to the terminal 23 by a conductor 21. Means, such as the line or transfer switch 28 having an operating winding 29, may be provided for selectively connecting the electrode 13 of welding circuit 12 to either the reduced voltage tap 26 through conductor 25 or to the terminal 24 through conductor 27 for the application of full welding voltage. A reactor 30 may be connected in series circuit relation with the electrode 13 and the conductor 27 from the terminal 24 for adjusting and stabilizing the value of the arc welding current.

In order to provide for controlling the operation of the line or transfer switch 28, control means may be provided, such as the time delay relay 32 which may comprise an operating winding 33, a holding winding 34, and time delay means which may be represented by a dash pot 36 which permits substantially instantaneous pickup or operation of the relay to the energized position, but retards the dropout for a predetermined time after deenergization of the relay windings. The operating winding 33 may be connected in circuit with the conductor 25 from the reduced voltage tap 26 and the arc welding circuit 12 by means of normally closed contact members 28c for operating the relay in response to the reduced open circuit voltage thereof. The holding winding 34 may be arranged for connection in shunt circuit relation with the reactor 30 through normally open contact members 28b for maintaining the relay in the energized position in response to the welding current responsive voltage available across the reactor during a welding operation.

When the electrode 13 is brought in contact with the work 15 for commencing a welding operation, voltage from the reduced voltage tap 26 is applied to the operating winding 33 of relay 32. This relay picks up substantially instantaneously, and connects the operating winding 29 of the line switch 28 to the source of alternating current through normally open contact members 32a. The line switch 28 operates, and full welding voltage is applied to the arc welding circuit 12 through normally open contact members 28a.

At the same time, the operating winding 33 of the time delay relay 32 is disconnected from the arc welding circuit by the opening of contact members 28c, while the holding winding 34 is connected in shunt circuit relation with the reactor 30 through contact members 28b. The time delay relay 32 will thus be maintained in the energized closed position while the welding operation continues.

When the welding operation is terminated, the holding winding 34 is deenergized. The time delay relay 32 remains in the operated position for a predetermined period of time, as determined by the dash pot 36, so that the line switch 28 is maintained energized for said predetermined period of time. If the welding operation is not recommenced within this period of time, the time delay relay 32 drops out and disconnects the operating winding 29 of the line switch from the source.

The line switch 28 returns to the deenergized or open position and disconnects the arc welding circuit 12 from the full welding voltage terminal 24. Reduced voltage is reapplied through contact members 28c to the arc welding circuit from the reduced voltage tap 26 on the welding transformer secondary winding.

Referring to Figure 2, it will be seen that instead of using a reduced voltage tap on the transformer 17 means, such as the autotransformer or voltage divider 38 having an intermediate or reduced voltage tap 39, may be utilized, in connection with a transformer 40 which has no tap. The autotransformer 38 may, for example, be connected across the secondary winding 41 of the welding transformer 40 to provide the desired reduced voltage source. The welding transformer 40 and autotransformer 38 may be jointly substituted for the transformer 17 in the circut shown in Figure 1. The line switch and time delay relay and other connections of the welding system shown in Figure 1 will be unchanged as shown by the designations of the conductors 21, 25 and 27, and the system operated in exactly the same manner as previously described.

From the above description and the accompanying drawing, it will be apparent that we have provided a simple and effective reduced open circuit voltage control system. A control system embodying our invention has a minimum number of moving parts and is efficient and reliable in operation. Because of its simplicity there is little or nothing to go wrong. It therefore affords the maximum protection and insures the safety of the welding operator. Operating and maintenance costs are reduced to a minimum, and the flexibility of the system is such that it may be readily applied to welding apparatus having various different operating characteristics.

Since certain changes may be made in the above described construction and different embodiments of the invention may be made without departing from the spirit or scope thereof, it is intended that all the matter contained in the above description and shown in the accompanying drawing shall be considered as illustrative, and not in a limiting sense.

We claim as our invention:

1. In an arc welding system, an arc welding circuit including an electrode and work upon which a welding operation is to be performed, a line switch normally connecting the welding circuit to a reduced voltage source and energizable to connect said welding circuit to a source of arc welding voltage, and switch means connected to be operable upon engagement of the electrode and work to energize the line switch, said switch means being reconnected by the line switch to maintain the switch means energized.

2. For use with an arc welding circuit, switch means normally connecting the arc welding circuit to a low voltage source and energizable to connect the welding circuit to a relatively high voltage source, and a time delay dropout relay operable to effect energization of the switch means, said relay having an operating winding normally connected to the welding circuit by the switch means and another winding arranged to be connected thereto when the switch means is in the energized position.

3. For use with an arc welding circuit, a reduced open circuit voltage control system consisting of, a main switch for normally connecting the arc welding circuit to a reduced voltage circuit and operable to connect said arc welding circuit to a relatively high voltage circuit, and a time delay relay of the rapid-pickup delayed-dropout type so connected to the welding circuit by the main switch as to be operable upon closure of the arc welding circuit to initiate operation of the main switch and maintain it in the operated position for a predetermined time after the arc welding circuit is opened.

4. A control system for an arc welding circuit comprising a switch for normally connecting the welding circuit to a reduced voltage circuit and operable to connect it to a relatively high voltage circuit, and control means operable to effect operation of the switch, said control means having an operating winding normally connected between the reduced voltage circuit and the welding circuit by the switch and a holding winding arranged to be connected in circuit with the high voltage circuit and the welding circuit when the switch is in the operated position.

5. A reduced open circuit voltage control system for an arc welding circuit comprising, time delay relay having a pair of independent operating windings, said relay having rapid-pickup and delayed-dropout characteristics, and switch means controlled by the time delay relay normally connecting one of the operating windings in circuit relation with a reduced voltage circuit and the welding circuit, said switch means being operable to connect the other operating winding in circuit relation with the welding circuit and a relatively high voltage circuit.

6. A control system for an arc welding circuit comprising, a transformer having a reduced voltage tap and a relatively high welding voltage tap, a line switch operable to connect the welding circuit to the high voltage tap and having an operating winding, a control relay of the delayed-dropout type having an operating winding normally connected between the reduced voltage tap and the welding circuit by the line switch and a holding winding arranged to be connected between the high voltage tap and the welding circuit by the line switch in the operated position, and circuit means controlled by the control relay for effecting the operation of the line switch.

7. A reduced open circuit control system for an arc welding circuit comprising, a transformer having a primary winding for connection to a source of alternating current and a secondary winding with a reduced voltage tap and an arc welding voltage tap, reactance means connected in circuit relation with the welding voltage tap, a time delay relay having an operating winding connected to the reduced voltage tap and a holding winding connected intermediate the reactance means and the winding voltage tap, and a switch normally connecting the reduced voltage tap in circuit relation with the arc welding circuit, said switch being operable in response to operation of the time delay relay to connect the arc welding circuit to the reactance means and to connect the holding winding in shunt relation with the reactance means.

8. In a control system for an arc welding circuit, voltage dividing means arranged to be connected to a source of welding voltage to provide a reduced control voltage circuit, a time delay relay having an operating winding connected to the reduced voltage circuit and a hold winding connected to the source of welding voltage, and switch means normally connecting the arc welding circuit in circuit relation with the holding winding and the reduced voltage circuit, said switch means being operable to connect the welding circuit to the source of welding voltage and to connect the holding winding in circuit relation therewith.

CHARLES P. CROCO.
JOHN H. BLANKENBUEHLER.

REFERENCES CITED

The following references are of record in the file of this patent:

UNITED STATES PATENTS

| Number | Name | Date |
|---|---|---|
| 2,078,690 | Schueler | Apr. 27, 1937 |
| 2,110,436 | Candy | Mar. 8, 1938 |
| 2,189,606 | King | Feb. 6, 1940 |